UNITED STATES PATENT OFFICE.

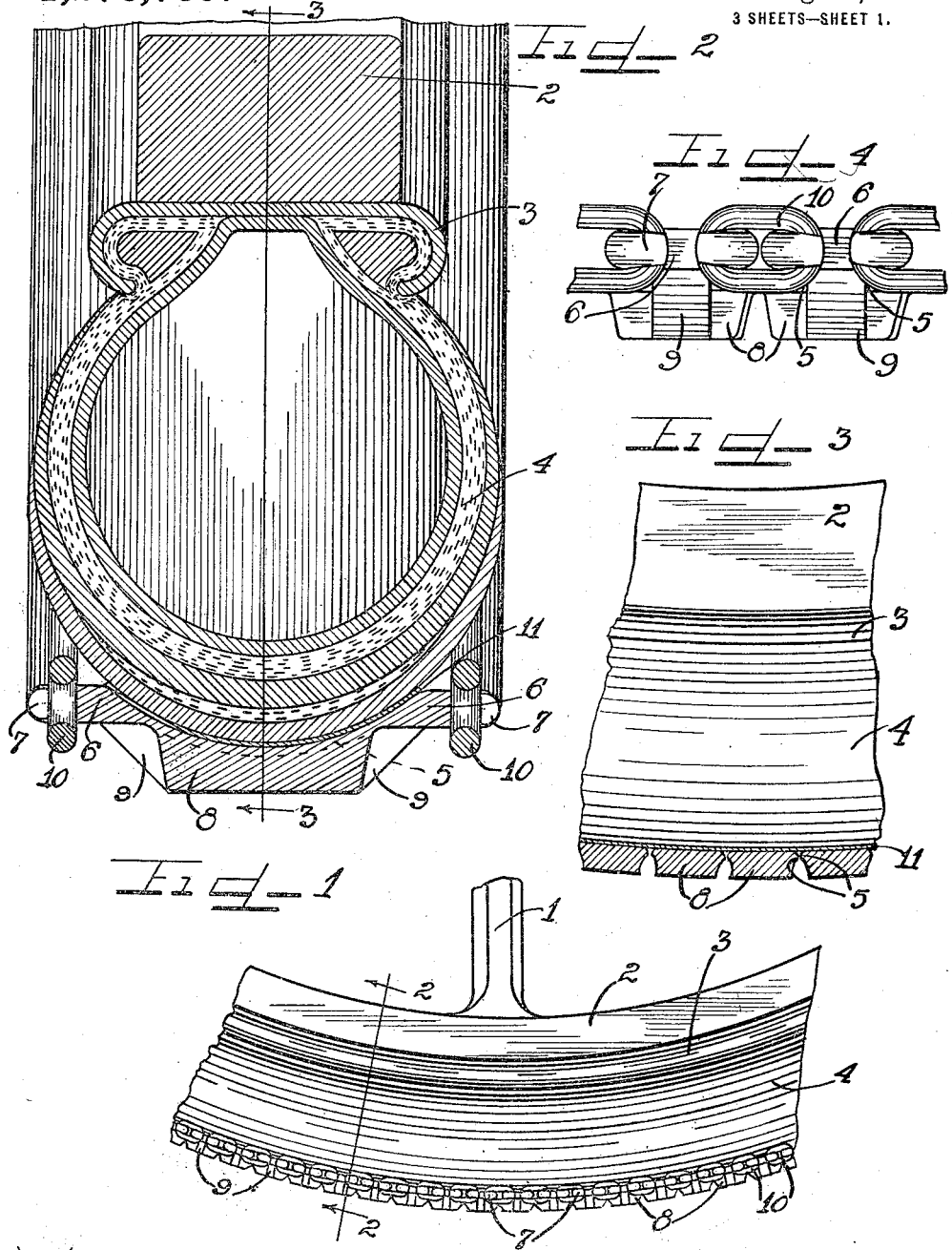

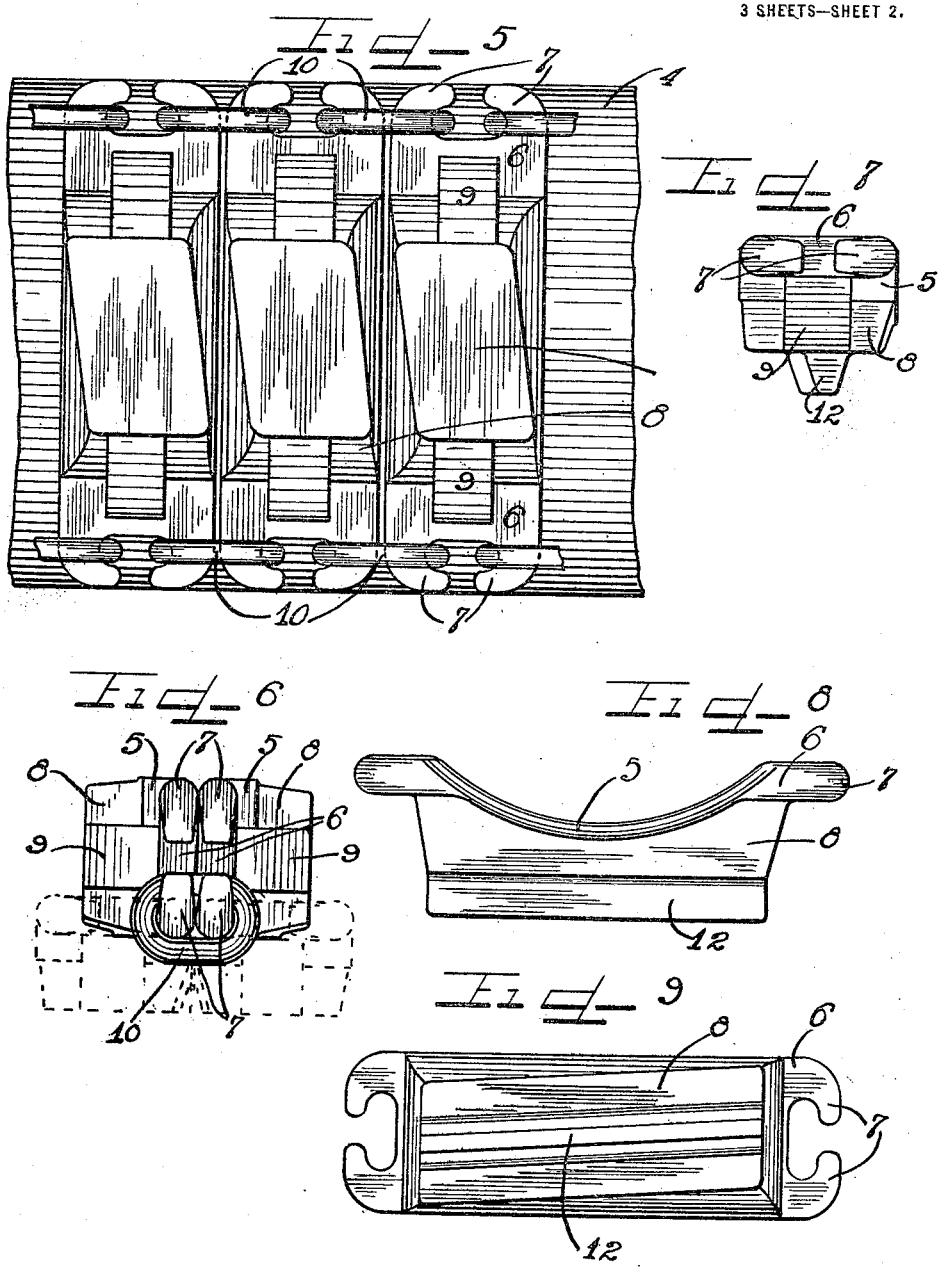

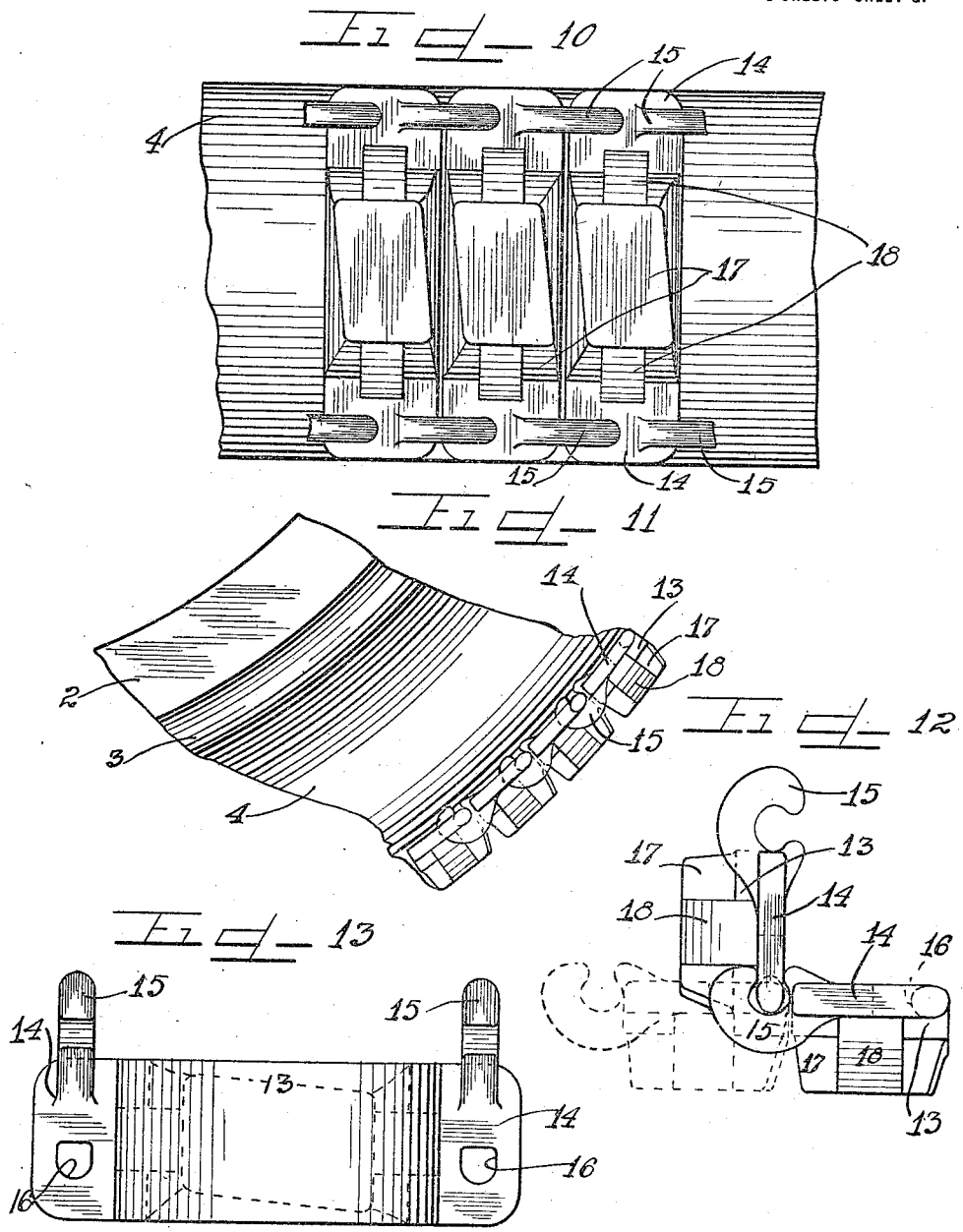

ABRAM MacMILLAN, OF CHICAGO, ILLINOIS.

TIRE-SHOE.

1,276,789. Specification of Letters Patent. Patented Aug. 27, 1918.

Application filed June 9, 1917. Serial No. 173,700.

*To all whom it may concern:*

Be it known that I, ABRAM MACMILLAN, a subject of the King of England, and a resident of the city of Chicago, in the county of Cook and State of Illinois, have invented certain new and useful Improvements in Tire-Shoes; and I do hereby declare that the following is a full, clear, and exact description of the same, reference being had to the accompanying drawings, and to the numerals of reference marked thereon, which form a part of this specification.

This invention relates to an improved form of armored tire shoe or metal traction rim adapted to be engaged peripherally around the rubber outer casing of a vehicle tire to protect and increase the traction of the tire, and furthermore prevent skidding of the vehicle wheel to which it is attached.

It is an object of this invention to provide a non-skid metal tire shoe for vehicle tires.

It is also an object of this invention to construct a linked metal traction rim adapted to engage around the periphery of a tire casing before inflation, and adapted to fit snugly therearound when the tire casing is inflated to prevent skidding and increase the life of the tire casing.

It is furthermore an important object of this invention to create a flexible outer tread casing for a vehicle tire comprising a plurality of interconnected metal heel plates or shoes, said tread casing mounted around the outer periphery of the tire before the same is inflated, and securely held in position by inflating the tire to force the same into a tight fit with the tread casing to prevent removal thereof.

It is an important object of this invention to construct a simple and efficient outer armored tire shoe for vehicle tires, embracing movably connected tread plates to increase the traction of the tires and prevent skidding.

Other and further important objects of this invention will be apparent from the disclosure in the drawings and specification.

The invention (in a preferred form) is illustrated in the drawings and hereinafter more fully described.

On the drawings:

Figure 1 is a side elevational view of a fragmentary portion of a vehicle wheel equipped with a tire shoe embodying the principles of this invention.

Fig. 2 is an enlarged section taken on line 2—2 of Fig. 1.

Fig. 3 is a reduced section taken on line 3—3 of Fig. 2, showing the fragmentary portion of the wheel in elevation.

Fig. 4 is a side elevational view of a portion of the tire shoe.

Fig. 5 is a plan view of a fragmentary portion of the tread of a tire shoe mounted upon a tire casing, parts of which are broken away.

Fig. 6 is a side elevational view of a portion of the tire shoe showing two adjacent members thereof moved into a position to engage one another and showing the normal position of said members in dotted lines.

Fig. 7 is an end view of a modified form of a traction heel plate.

Fig. 8 is a side elevational view thereof.

Fig. 9 is a plan view of the tread portion thereof.

Fig. 10 is a plan view of the tread of a fragmentary portion of another modified form of tire shoe mounted upon a portion of a tire casing.

Fig. 11 is a fragmentary side elevation of a portion of a tire casing equipped with the modified tire shoe shown in Fig. 10.

Fig. 12 is an end elevational view of two connected heel plates of the type shown in Fig. 10, showing the method of engaging one with the other.

Fig. 13 is a top plan view of one of the heel plates shown in Fig. 12.

As shown on the drawings:

The reference numeral 1, indicates a spoke of a vehicle wheel, and 2, the felly thereof, upon which is mounted a metal rim 3, for holding a rubber tire casing 4, in position upon said wheel. Removably mounted upon the outer periphery of the tire casing 4, to inclose the same, is a continuous chain, tire shoe, traction rim, or flexible tread casing embodying the principles of this invention, and comprising a plurality of similarly constructed shoes or tread plates, each embracing a unitary casting consisting of a concave plate 5, having integrally formed on each end thereof an outwardly extending lug or arm 6, disposed at an angle with respect to the ends of said concave plate. Each of said arms 6, has integrally formed on each side of the outer end thereof an inwardly directed hook or curved finger 7, disposed in the plane of said arms with the ends of said hooks spaced a short distance apart, as clearly shown in Fig. 5. Formed integrally below the concave plate 5, is a spirally twisted tapered heel or tread block 8, the base of which is flat and is slightly twisted at an angle with respect to the sides of the concave plate 5. Integrally formed between each of the arms 6, and the heel 8, is a reinforcing rib or web 9. To form the continuous tire shoe, the shoes are disposed adjacent one another and are releasably connected together by means of metal links or rings 10, which engage adjacently disposed hooks 7, and are prevented from being released by the hook ends of each pair of connected hooks which are bent in opposite directions from each other. The links 10, are mounted in position by placing adjacent shoes with the inner faces of the arms 6 engaging each other, thus bringing the adjacent hooks 7 together, as shown in Fig. 6, to permit a link 10, to engage over the ends of said hooks. The shoes are then moved away from each other into the dotted line position of Fig. 6, with the links 10 connecting the shoes to form a continuous armored link belt which may be disposed around the outer periphery of the tire casing 4, before the same is inflated with air. The concave surfaces of the shoe plates 5, form the inner periphery of the link belt, and are disposed to lie adjacent the outer periphery of the tire casing and form a groove into which the tire casing is forced to seat snugly therein when air is pumped into the tire casing to inflate the same. To prevent the heat from the metal link, caused by the rolling of the armored link belt on the ground, from being transmitted to the rubber tire casing, a strip of insulation 11, of any desired kind is placed between the link belt and the tire casing, as shown in Fig. 2.

In the modified form of shoe casting shown in Figs. 7, 8 and 9, the construction is the same as that already described, except that a tapered rib or flange 12, is integrally formed centrally and longitudinally on the bottom of the heel 8, and is inclined with respect to the sides of the shoe, as shown in Fig. 9, thus forming shoes which may be readily connected together by metal links engaging adjacent hooks 7, to form a continuous link belt or chain adapted for tractor use.

Figs. 10 to 13, inclusive, disclose another modified form of tire shoe or continuous link belt made up of a plurality of shoes or tread plates, each comprising a concave plate 13, having an outwardly extending lug or arm 14, integrally formed on each end thereof and bent at an angle to the ends of said concave plate. Formed integrally at right angles on one side of each of the arms 14, is an outwardly projecting hook or curved finger 15, while in the opposite side of each of said arms, alined with each of said hooks, is an opening or aperture 16. Integrally formed on the bottom of the concave plate 13, is a heel or tread block 17, the outer end of which is slightly twisted with respect to the inner end thereof to lie at an angle with respect to the sides of the shoe, as shown in Fig. 10. To reinforce the arms 14, a rib or web 18, is integrally formed between each end of the heel 17, and the arms 14. To connect the shoes to form a continuous tire shoe or link belt, the unitary shoe castings are positioned, as shown in Fig. 12, with the sides of the arms 14, opposite the hooked sides of one shoe stated at right angles in the hooks 15, of another shoe, to permit the ends of the hooks of the second shoe to engage in the apertures 16, of the first shoe when it is moved into the dotted line position shown in Fig. 12, thus forming a flexible tire shoe, the ends of which may be connected together to form a continuous link belt adapted to be engaged around the outer periphery of a tire casing 4, before the same is inflated. The tire casing is adapted to seat tightly in the groove formed by the concave plates 13, when the tire casing is inflated with air, thus holding the continuous tire shoe in position upon a vehicle wheel.

The operation of the tire shoe when mounted upon the rubber tire casing of a vehicle wheel is believed to be evident from the drawings, the tire shoe being held secured in position by inflating the tire with air. The flexibility of the tire shoe, of course, permits the same to readily adapt itself to any irregularities in the road bed over which a vehicle is run. The peculiar twisted construction of the outer or bearing ends of the heels 8, tends to prevent skidding.

To detach the tire shoe from a vehicle wheel, the air in the tire must first be allowed to escape, thereby permitting the tire shoe to be loosened sufficiently to permit the same to be slipped off of the tire casing, or allowing two adjacent shoe castings to be moved into the position shown in Fig. 6, for the removal of the links 10, connecting said shoe castings.

I am aware that various details of construction may be varied through a wide range without departing from the principles of this invention, and I therefore do not purpose limiting the patent granted otherwise than necessitated by the scope of the appended claims.

I claim as my invention:

1. A flexible link belt comprising a plurality of removably connected concave shoes, and hooks directed inwardly toward one another integrally formed on the end of said concave shoe adapted to permit said concave shoes to be removably connected one to another to form the flexible link belt.

2. In a device of the class described, a plurality of interconnected tread blocks, each comprising a concave portion, arms integral with the ends thereof, inwardly directed curved members integral with each of said arms to permit connection of said tread blocks to form said device, and a twisted heel piece integral with said concave portion.

3. A non-skid tire shoe of the class described comprising concave members, twisted heels integral therewith, hooks integrally formed on said concave members and means associated with said hooks to permit the concave members to be removably connected one to another to form the tire shoe.

4. In a tire shoe for use upon a vehicle tire casing to increase the traction thereof, a plurality of concave members, arms on each thereof, a twisted heel piece on each of said concave members, ribs integrally connected between the arms and heel piece of each of said concave members to reinforce the same, hooks integral with said arms and disposed in the same plane therewith, and means for removably connecting said hooks one to another to form the tire shoe of said concave members.

5. A shoe comprising a concave plate, arms thereon, hooks integral therewith disposed in the plane of said arms, a reinforced spirally twisted heel piece on said concave plate, the outer end of which is disposed at an angle with respect to the sides of said concave plate, and means engaging said hooks adapted to permit a number of similarly constructed shoes to be removably connected together to form a flexible tire chain adapted to be mounted around the periphery of a tire casing before inflation thereof and be held in position on said tire casing when the tire casing is inflated.

6. A tire shoe for use upon a tire casing comprising a plurality of removably connected unitary metal shoes consisting of a concave plate, arms formed thereon, hooks integrally formed on said arms, and a heel integrally formed on the outer portion of said concave plates.

In testimony whereof I have hereunto subscribed my name in the presence of two subscribing witnesses.

ABRAM MacMILLAN.

Witnesses:
CHARLES W. HILLS, Jr.,
EARL M. HARDINE.

Copies of this patent may be obtained for five cents each, by addressing the "Commissioner of Patents, Washington, D. C."